United States Patent [19]

Kobayashi et al.

[11] 4,212,961
[45] Jul. 15, 1980

[54] PROCESS FOR PRODUCING SOFT RESINS

[75] Inventors: Akio Kobayashi, Suita; Kentaro Mashita, Ibaraki, both of Japan

[73] Assignee: Sumitomo Chemical Company, Limited, Osaka, Japan

[21] Appl. No.: 946,612

[22] Filed: Sep. 28, 1978

[30] Foreign Application Priority Data

Oct. 11, 1977 [JP] Japan .................. 52-122079

[51] Int. Cl.$^2$ .................. C08F 4/66; C08F 210/02
[52] U.S. Cl. .................. 526/151; 252/429 C; 526/142; 526/348.6
[58] Field of Search .................. 526/151, 348.6

[56] References Cited

U.S. PATENT DOCUMENTS

| | | | |
|---|---|---|---|
| 3,058,963 | 10/1962 | Vandenberg | 526/151 |
| 3,801,558 | 4/1974 | Fletcher et al. | 526/142 |
| 3,821,186 | 6/1974 | Grant | 526/151 |
| 3,917,575 | 11/1975 | Matsuura et al. | 526/151 |

FOREIGN PATENT DOCUMENTS 47-26185 7/1972 Japan .
50-15583 12/1975 Japan .
51-41784 4/1976 Japan .

*Primary Examiner*—Edward J. Smith
*Attorney, Agent, or Firm*—Stevens, Davis, Miller & Mosher

[57] ABSTRACT

A process for producing soft copolymers which comprises copolymerizing ethylene and butene-1 in the presence of a catalyst comprising (1) a reaction product of (A) an organic titanium compound of the formula, $$Ti(OR)_n X_{4-n}$$

wherein R is a hydrocarbon residue having 1 to 10 carbon atoms, X is a halogen atom and n is a number satisfying the equation $0 < n \leq 4$, and (B) an organo-magnesium compound, and (2) an organo-aluminum compound of the formula, $$AlR'_m X'_{3-m}$$

wherein R' is a hydrocarbon residue having 1 to 20 carbon atoms, X' is a halogen atom and m is a number satisfying the equation $0 < m \leq 3$, the content of butene-1 in the copolymers being 10 to 30 mole %.

10 Claims, No Drawings

PROCESS FOR PRODUCING SOFT RESINS

The present invention relates to a process for producing soft ethylene/butene-1 copolymers.

It is well known that the so-called Ziegler-Natta catalyst, which comprises the combination of a compound of a transition metal such as titanium or vanadium belonging to Groups IVa to VIa of the periodic table with an organic compound of a metal belonging to Groups I to III of the periodic table, is effective for low-pressure copolymerization of ethylene and α-olefin, producing resinous crystalline high polymers. And, Ziegler-Natta catalysts which act to copolymerize ethylene and an α-olefin into rubber-like high polymers are also well known.

But, there are little or no reports on substances having properties lying midway between those of resins and rubbers, that is, soft resins which are soft, well expansible and elastic like rubbers and are of high strength like resins.

Japanese Patent Publication No. 26185/1972 discloses a process in which ethylene-rich soft resins are produced from ethylene and propylene by the action of a catalyst system comprising a vanadium compound as one component. But, the ethylene/propylene copolymers thus obtained are not such that flexibility and high strength which are characteristic of soft resins are obtained at the same time. That is, when the ethylene content is decreased in order to increase softness, strength becomes low; while when the ethylene content is increased in order to increase strength, softness becomes insufficient. Thus, substances having satisfactory both flexibility and strength have not yet been obtained.

Further, Japanese Patent Publication (unexamined) No. 155,583/1975 discloses a process in which soft resins are produced from ethylene and butene-1 by the action of a catalyst system comprising a vanadium compound as one component. According to this process, ethylene/butene-1 copolymers having an ethylene content of 84 to 95 mole % satisfy both elasticity and strength requirements to a fair degree, but both properties are not yet sufficient.

The inventors extensively studied a process for producing soft resins in a high yield which are satisfactory in the aforesaid properties, that is, which are well flexible, elastic and expansible and at the same time are of high strength. As a result, it was found that these requirements are satisfied by ethylene/butene-1 copolymers which are produced using a combined catalyst system of a special titanium compound and an organo-aluminum compound and at the same time which are richer in butene-1 than those resins conventionally known. The inventors thus attained the present invention.

An object of the present invention is to provide a process for producing soft resins in a high yield which are quite soft and elastic like rubbers and at the same time which are of high strength like resins. According to the present invention, there is provided a process for producing soft resins having a butene-1 content of 10 to 30 mole % characterized by copolymerizing ethylene and butene-1 in the presence of a catalyst comprising (1) a reaction product of (A) an organic titanium compound of the formula, $$Ti(OR)_nX_{4-n}$$

wherein R is a hydrocarbon residue having 1 to 10 carbon atoms, X is a halogen atom and n is a number satisfying the equation $0 < n \leq 4$, and (B) an organomagnesium compound (referred to as "first catalyst component" hereinafter), and (2) an organo-aluminum compound of the formula, $$AlR'_mX'_{3-m}$$

wherein R' is a hydrocarbon residue having 1 to 20 carbon atoms, X' is a halogen atom and m is a number satisfying the equation $0 < m \leq 3$, (referred to as "second catalyst component" hereinafter).

The soft resins obtained by the process of the present invention have the following properties: Tensile strength 50–350 kg/cm²; elongation at break 400–1,000%; modulus of elastic recovery 80–95%; modulus of torsion stiffness at 20° C. 40–400 kg/cm²; surface hardness (Shore A) 60–95; melt index 0.01–50 g/10 min.; density 0.86–0.90 g/cm³; Gehman freezing temperature −40°–−80° C.; rebound resilience 40–60%; and compression set 70–90%.

Ethylene/butene-1 copolymers having a butene-1 content of less than 10 mole % may not be said to be a soft resin since the modulus of elastic recovery is less than 80%, modulus of torsion stiffness is more than 400 kg/cm² and surface hardness is more than 95. While ethylene/butene-1 copolymers having a butene-1 content of more than 30 mole % are not used as a soft resin since they are rubber-like and have a tensile strength as low as less than 50 kg/cm².

The soft resins obtained by the present invention have sufficient softness, elasticity and strength and proper adhesiveness, and they can be applied to the same usages as the common soft resins. That is, they are used for films, sheets, tubes, hoses, machine parts, daily sundry goods, resin modifiers and the like.

The organic titanium compound used in the process of the present invention is represented by the following formula, $$Ti(OR)_nX_{4-n}$$

wherein R is a hydrocarbon residue having 1 to 10 carbon atoms, X is a halogen atom and n is a number satisfying the equation $0 < n \leq 4$.

In the above formula representing the organic titanium compound, R includes preferably methyl, ethyl, n-propyl, isopropyl, n-butyl, tert-butyl, n-amyl, isoamyl, hexyl, octyl, 2-ethylhexyl and phenyl groups. X includes chlorine, bromine and iodine atoms.

Specifically, the organic titanium compound includes tetramethoxy-titanium, tetraethoxytitanium, tetra-n-propoxytitanium, tetraisopropoxytitanium, tetra-n-butoxytitanium, tetra-tert-butoxytitanium, tetraoctoxytitanium, triethoxytitanium monochloride, tri-n-propoxytitanium monochloride, triisopropoxytitanium monochloride, tri-n-butoxytitanium monochloride, tri-tert-butoxytitanium monochloride, diethoxytitanium dichloride, di-n-propoxytitanium dichloride, diisopropoxytitanium dichloride, di-n-butoxytitanium dichloride, di-tert-butoxytitanium dichloride, ethoxytitanium trichloride, n-butoxytitanium trichloride, tert-butoxytitanium trichloride and the like. These titanium compounds are reacted, alone or in mixtures thereof, with an organo-magnesium compound.

The organo-magnesium compound used in the process of the present invention is one generally called Grignard reagent of the formula, $$R''MgX''$$

wherein R'' is a hydrocarbon residue having 1 to 10 carbon atoms and X'' is a halogen atom. The organo-magnesium compound referred to herein includes any type of organo-magnesium compounds generally produced by reaction between alkyl halide (R''X'') and metallic magnesium (Mg). In other words, the compound may have any of the compositions present in the following equilibrium state [W. Shlenk and W. Shlenk Jr., Ber. 62, 920 (1929); ibid. 64, 739 (1931)]:

$$2R''MgX'' \rightleftarrows R''_2Mg + MgX''_2 \rightleftarrows R''_2Mg \cdot MgX''_2$$

Specifically, there may be exemplified compounds wherein R'' is a $C_1$-$C_{10}$ alkyl group such as methyl, ethyl, n-propyl, isopropyl, n-butyl, isobutyl, n-amyl, isoamyl, hexyl, octyl or 2-ethylhexyl, or a phenyl group. That is, as examples there may be given alkyl- and phenyl-magnesium halides such as methylmagnesium chloride, ethylmagnesium chloride, n-propylmagnesium chloride isopropylmagnesium chloride, n-butylmagnesium chloride, isobutylmagnesium chloride, isoamylmagnesium chloride, hexymagnesium chloride, octylmagnesium chloride and phenylmagnesium bromide; and equilibrium compositions represented by the formula, $$R''_2Mg \cdot MgX''_2$$

The dialkyl- or phenyl-magnesium compound of the formula, $R''_2Mg$, is also included in the organo-magnesium compounds of the present invention as shown in the foregoing equilibrium equation. Specifically, the compound includes dimethylmagnesium, diethylmagnesium, di-n-propylmagnesium, diisopropylmagnesium, di-n-butylmagnesium, diisobutylmagnesium, di-isoamylmagnesium, dihexylmagnesium, dioctylmagnesium, diphenylmagnesium, and the like. These organomagnesium compounds are synthesized in the presence of an ether solvent (e.g. diethyl ether, dipropyl ether, dibutyl ether, tetrahydrofuran, dioxane) or a hydrocarbon solvent (e.g. hexane, heptane, octane) and used.

Solvents used for synthesis of the first catalyst component include aliphatic hydrocarbons (e.g. pentane, hexane, heptane, octane), alicyclic hydrocarbons (e.g. cyclohexane, cyclopentane) and aromatic hydrocarbons (e.g. benzene, toluene, xylene).

In synthesis of the first catalyst component, the molar ratio of organo-magnesium compound to $Ti(OR)_nX_{4-n}$ is preferably 0.3 to 3, particularly preferably 0.5 to 1.5, and the reaction temperature is generally −80° to 100° C., preferably 0° to 50° C.

The reaction product thus obtained is used as it is or after it is dried, or after it is filtered and dried, or after it is filtered, thoroughly washed with a purified hydrocarbon diluent and dried.

The reaction product itself thus obtained (the first catalyst component) is low in activity as a catalyst for olefin polymerization. But, it displays an extremely high activity in olefin copolymerization by combining it will the second catalyst component, i.e. an organo-aluminum compound of the formula, $$AlR'_mX'_{3-m}$$

wherein R' is a hydrocarbon residue having 1 to 20 carbon atoms, X' is a halogen atom and m is a number satisfying the equation $0 < m \leq 3$, which acts as an activating agent. In the foregoing formula, R' includes, for example, alkyl, alkenyl, aryl, aralkyl, alkylaryl and cycloalkyl groups, and X' includes chlorine, bromine, iodine and fluorine atoms.

Specifically, the organo-aluminum compounds include trimethyl aluminum, triethylaluminum, triisobutylaluminum, trihexylaluminum, trioctylaluminum, methylaluminum dichloride, ethylaluminum dichloride, cyclohexylaluminum dichloride, methylaluminum dibromide, ethylaluminum diiodide, ethylaluminum sesquichloride, ethylaluminum sesquibromide, ethylaluminum sesquifluoride, diethylaluminum monochloride, diethylaluminum monobromide, diethylaluminum monofluoride, ethylphenylaluminum monochloride, dicyclohexylaluminum monochloride and the like.

The present invention is characterized in that the special titanium compounds are used as the first catalyst component. Sufficient effects can not be expected with vanadium compounds. This may be considered as due to the following reason: As is generally said, vanadium compounds increase the proportion of random sequence in the copolymers of ethylene and α-olefin so that rubber-like copolymers are easily produced. In order to obtain soft resins in a high yield which have a butene-1 content of 10 to 30 mole % and at the same time which are flexible and elastic and are of high strength, it is necessary to carry out ethylene/butene-1 copolymerization using the special titanium compounds of the present invention which give high activity on the copolymerization and copolymers having a large proportion of block sequence therein.

As butene-1 used in the present invention, the so-called spent B-B fraction produced by naphtha cracking can be used.

In carrying out the process of the present invention, the concentrations and proportions of the catalyst components can be widely varied with polymerization conditions, and therefore they are not particularly limited. Generally, however, the amount of the first catalyst component is 0.0001 to 10, preferably 0.01 to 0.5, millimole (converted to titanium basis) per liter of reaction system. The proportion of second catalyst component to first one is also not particularly limited, but, generally the amount of the second catalyst component is 1 to 100 moles, preferably 3 to 50 moles, per mole of the first catalyst component (converted to titanium basis). Both catalyst components may be added at any time.

In the present invention, it is essential to obtain ethylene/butene-1 copolymers having a butene-1 content of 10 to 30 mole %. The butene-1 content depends chiefly upon the concentration ratio of butene-1 to ethylene in the polymerization system as is conventionally known in this type of polymerization, and therefore the objective copolymers can easily be obtained by properly selecting the concentration of butene-1 in the polymerization system. Preferably, the concentration ratio of butene-1 to ethylene in the polymerization system is within the range of about 9:1 to about 40:1 (weight basis).

In carrying out the process of the present invention, the form of polymerization is not particularly limited. Preferably, the polymerization is carried out in a liquid phase. For example, polymerization may be carried out by bulk polymerization of ethylene and butene-1 in a liquefied butene-1 monomer or by copolymerization of ethylene and butene-1 in an inert solvent. In the case of solution polymerization, solvents such as hydrocarbons or polyhalogen-containing hydrocarbons which can dissolve the resulting copolymers under polymerization conditions are used. Specifically, the solvents include hexane, heptane, octane, cyclohexane, benzene, toluene, xylene, trichloroethylene, tetrachloroethylene and the like. Lower hydrocarbons such as propane, butane and pentane can also be used in high temperature conditions wherein the resulting copolymers can be dissolved in them. In the case of slurry polymerization, solvents which precipitate the resulting copolymers under polymerization conditions can be used. The solvents include, for example, lower hydrocarbons (e.g. propane, butane, pentane) and lower halogenated hydrocarbons (e.g. methyl chloride, ethylene dichloride). These solvents may be used in combination.

In the present invention, generally, the polymerization temperature can be selected optionally within the range of $-40°$ to $200°$ C. In the case of solution polymerization, generally, the temperature is preferably within the range of $60°$ to $200°$ C. In the case of slurry polymerization, the range of $-40°$ to $60°$ C. preferred.

As to the reaction pressure, a total pressure of 0 to 50 kg/cm$^2$, preferably 0 to 25 kg/cm$^2$, is used.

The molecular weight of the resulting copolymers can be controlled by adding hydrogen to the polymerization system.

After the reaction is finished, the copolymers are recovered as usual, for example by the aftertreatment techniques conventionally employed in polymerization processes with Ziegler-Natta catalysts.

Next, the present invention will be illustrated specifically with reference to the following examples, but the present invention is not limited to these examples.

In the examples, the physical properties of the resulting copolymers were measured as follows:
1. Tensile strength (kg/cm$^2$) an elongation at break (%)
   Measured according to JIS K 6301 (Tensile rate: 500 mm/min)
2. Modulus of elastic recovery (%)
   A test sample of tanzaku-form (width 20 mm; gauge length 25 mm; thickness 1 mm) was drawn by 100% at a tensile rate of 50 mm/min and allowed to stand for 1 minute in that tension state.
   Rate of residual elongation was measured 10 minutes after the stress was released and modulus of elastic recovery was calculated according to the following equation:

$$D = \frac{L - L_x}{L - L_o} \times 100$$

D: Modulus of elastic recovery
L: Gauge length on elongation (mm)
$L_x$: Gauge length after 10 minutes (mm)
$L_o$: Initial gauge length (mm)
3. Modulus of torsion stiffness (kg/cm$^2$)
   Measured according to JIS K 6745 4-1. Surface hardness (shore A)
   Measured with Shore A type hardness tester according to ASTM D 2240-64
4-2. Surface hardness (shore D)
   Measured according to ASTM D 2240-64 T 5. Melt index (g/10 min)
   Measured at $190°$ C. according to JIS K 6760
6. Flow beginning temperature (°C.)
   A test sample was filled in the cylinder of a Koka type flow tester and heated at a rate of $6°$ C./min under a pressure of 20 kg/cm$^2$. The flow beginning temperature refers to the temperature at which the sample begins to flow down through a die (diameter 1 mm $\phi$; length 1 mm).
7. Rebound resilience (%)
   Measured at $20°$ C. according to JIS K 6301
8. Compression set (%)
   Heat treatment was carried out at $70°$ C. for 22 hours according to JIS K 6301.

EXAMPLE 1

(1) Synthesis of organo-magnesium compound

To a 500-ml flask equipped with a stirrer, a reflux condenser and a dropping funnel were added 17.2 g (0.7 mole) of ribbon-form magnesium. Air and moisture in the flask were sufficiently removed by replacement with nitrogen. Thereafter, 63 ml (0.6 mole) of n-butyl chloride and 350 ml of diethyl ether were added to the dropping funnel, and about 30 ml of the mixture was added dropwise to allow reaction to start. After beginning of the reaction, addition of the mixture was continued so that ether was properly refluxed by reaction heat generated (the addition was finished after 75 minutes). After the addition was finished, the reaction was continued while refluxing the reaction system for a further about 1 hour. Thereafter, the reaction system was cooled to room temperature and filtered through a glass filter to separate unreacted magnesium.

The concentration of organo-magnesium compound in diethyl ether was measured by hydrolyzing the compound with 1 N aqueous sulfuric acid solution followed by back titration with 1 N aqueous sodium hydroxide solution. It was found that the concentration was 1.48 mole/liter.

(2) Preparation of first catalyst component

The atmosphere in a 1-liter flask equipped with a stirrer and a dropping funnel was replaced with dry nitrogen, and 500 ml of n-heptane and 39 g (0.17 mole) of tetraethoxytitanium were added thereto.

Thereafter, 100 ml of diethyl ether solution containing the organo-magnesium compound (0.14 mole) synthesized in (1) were charged in the dropping funnel and added dropwise over about 1 hour to the n-heptane solution of tetraethoxytitanium which was violently stirred. During that period, the temperature of the reaction system was always kept at $3°$ to $4°$ C. After the addition was finished, reaction was continued at room temperature for 3 hours. The reaction product was suspended as a solid in the reaction system. After allowing to stand, the supernatant liquor was decanted, and the product was washed five times with 100 ml of n-heptane and dried. Thus, a dark blue reaction product was obtained (referred to as "first catalyst component A" hereinafter). This first catalyst component A contained 18.2% by weight of titanium atom.

(3) Polymerization

Polymerization was carried out in a 5-liter stainless steel autoclave equipped with an electromagnetic stirrer. The autoclave was previously dried and the atmosphere in the autoclave was sufficiently replaced with nitrogen. Thereafter, 2.5 liters of sufficiently dehydrated and deoxidized n-heptane and 6 mmoles of diethylaluminum monochloride were added, and then 140 g of butene-1 were charged. After raising the temperature to 90° C., 78 mg of the first catalyst component A were added to the autoclave and hydrogen was charged to a partial pressure of 0.2 kg/cm$^2$. Thereafter, ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 90 minutes. After the reaction was stopped with addition of isopropanol, the unreacted gas was purged. The resulting polymer was dried under reduced pressure to obtain 160 g of a white ethylene/butene-1 copolymer.

By infrared absorption spectrum analysis, it was found that the butene-1 content in the copolymer was 21 mole %. Further, it was found that melt index at 190° C. was 0.28 g/10 min. and density was 0.88 g/cm$^3$. Melting point was measured by means of a differential scanning calorimeter, but it was not observed as a clear peak over the range of 0° to 200° C.

This copolymer was formed into a test sample by pressing and the physical properties of the copolymer were measured: Tensile strength 210 kg/cm$^2$; elongation at break 660%; modulus of elastic recovery 89%; modulus of torsion stiffness at 20° C. 56 kg/cm$^2$; modulus of torsion stiffness at 0° C. 101 kg/cm$^2$; surface hardness (Shore A) 88; Gehman freezing temperature −61° C.; rebound resilience 51%; compression set (70° C.×22 hours) 82%; and flow beginning temperature by a flow tester 92° C.

EXAMPLE 2

(1) Preparation of first catalyst component

The first catalyst component was prepared in the same manner as in Example 1 except that tetrabutoxytitanium was used in place of tetraethoxytitanium (referred to as "first catalyst component B" hereinafter). This first catalyst component B contained 16.7% by weight of titanium atom.

(2) Polymerization

Polymerization was carried out according to Example 1. To the autoclave were added 2.5 liters of n-heptane, 3 mmoles of diethylaluminum monochloride and 3 mmoles of triethylaluminum, and then 160 g of butene-1 were added thereto. After raising the temperature to 90° C., 54 mg of the first catalyst component B prepared in (1) were added, and ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 150 minutes. Thus, 173 g of a white ethylene/butene-1 copolymer were obtained.

By infrared absorption spectrum analysis, it was found that the butene-1 content of the copolymer was 22 mole %. Further, it was found that melt index at 190° C. was 0.34 g/10 min. and density was 0.88 g/cm$^3$. Melting point was measured by means of a differential scanning calorimeter, but it was not observed as a clear peak over the range of 0° to 200° C.

This copolymer was formed into a test sample by pressing and the physical properties of the copolymer were measured: Tensile strength 187 kg/cm$^2$; elongation at break 670%; modulus of elastic recovery 90%; modulus of torsion stiffness at 20° C. 64 kg/cm$^2$; modulus of torsion stiffness at 0° C. 97 kg/cm$^2$; surface hardness (Shore A) 87; Gehman freezing temperature −61° C; rebound resilience 51%; compression set (70° C.×22 hours) 82%; and flow beginning temperature by a flow tester 104° C.

EXAMPLE 3

(1) Preparation of first catalyst component

The first catalyst component was prepared in the same manner as in Example 1 except that ethyl chloride was used in place of n-butyl chloride and tri-n-butoxytitanium monochloride was used in place of tetraethoxytitanium (referred to as "first catalyst component C" hereinafter). This first catalyst component C contained 17.0% by weight of titanium atom.

(2) Polymerization

Polymerization was carried out according to Example 1. To the autoclave were added 2 liters of n-heptane and 6 mmoles of diethylaluminum monochloride, and then 200 g of butene-1 were added thereto. After raising the temperature to 90° C., 64 mg of the first catalyst component C prepared in (1) were added, and hydrogen was charged to a partial pressure of 0.3 kg/cm$^2$. Thereafter, ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 180 minutes. Thus, 192 g of a white ethylene/butene-1 copolymer were obtained.

By infrared absorption spectrum analysis, it was found that the butene-1 content of the copolymer was 25 mole %. Further, it was found that melt index at 190° C. was 0.57 g/10 min. and density was 0.88 g/cm$^3$. Melting point was measured by means of a differential scanning calorimeter, but it was not observed as a clear peak over the range of 0° to 200° C.

This copolymer was formed into a test sample by pressing and the physical properties of the copolymer were measured: Tensile strength 171 kg/cm$^2$; elongation at break 760%; modulus of elastic recovery 91%; modulus of torsion stiffness at 20° C. 46 kg/cm$^2$; modulus of torsion stiffness at 0° C. 67 kg/cm$^2$; surface hardness (Shore A) 80; Gehman freezing temperature −66° C.; rebound resilience 54%; compression set (70° C.×22 hours) 81%; and flow beginning temperature by a flow tester 96° C.

EXAMPLE 4

(1) Preparation of first catalyst component

The first catalyst component was prepared in the same manner as in Example 1 except that diisopropoxytitanium dichloride was used in place of tetraethoxytitanium (referred to as "first catalyst component D" hereinafter). This first catalyst component D contained 20.4% by weight of titanium atom.

(2) Polymerization

Polymerization was carried out according to Example 1. To the autoclave were added 2.5 liters of n-heptane and 6 mmoles of triisobutylaluminum, and then 120 g of butene-1 were added thereto. After raising the temperature to 90° C., 91 mg of the first catalyst component D prepared in (1) were added, and hydrogen was charged to a partial pressure of 0.3 kg/cm$^2$. Thereafter, ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 120 minutes. Thus, 234 g of a white ethylene/butene-1 copolymer were obtained.

By infrared absorption spectrum analysis, it was found that the butene-1 content of the copolymer was 17 mole %. Further, it was found that melt index at 190° C. was 0.30 g/10 min. and density was 0.89 g/cm$^3$.

This copolymer was formed into a test sample by pressing and the physical properties of the copolymer were measured: Tensile strength 209 kg/cm$^2$; elongation at break 570%; modulus of elastic recovery 91%; modulus of torsion stiffness at 20° C. 192 kg/cm$^2$; surface hardness (Shore A) 92.

EXAMPLE 5

Operation was carried out according to Example 1. To the autoclave were added 2 liters of n-heptane and 6 mmoles of diethylaluminum monochloride, and then 150 g of butene-1 were added thereto. After raising the temperature to 120° C., 51 mg of the first catalyst component A prepared in Example 1 were added, and then ethylene was charged to a partial pressure of 4 kg/cm$^2$ to start polymerization. During the polymerization, the temperature in the autoclave was controlled so as to keep a constant temperature of 120° C., and ethylene was supplied continuously so that the total pressure was kept constant. The reaction was carried out for 40 minutes. Thus, 183 g of a white ethylene/butene-1 copolymer were obtained.

By infrared absorption spectrum analysis, it was found that the butene-1 content of the copolymer was 26 mole %. Further, it was found that the melt index at 190° C. was 0.30 g/10 min. and density was 0.88 g/cm$^3$. Melting point was measured by means of a differential scanning calorimeter, but it was not observed as a clear peak over the range of 0° to 200° C.

This copolymer was formed into a test sample by pressing and the physical properties of the copolymer were measured: Tensile strength 184 kg/cm$^2$; elongation at break 770%; modulus of elastic recovery 93%; modulus of torsion stiffness at 20° C. 41 kg/cm$^2$; modulus of torsion stiffness at 0° C. 61 kg/cm$^2$; and surface hardness (Shore A) 78.

EXAMPLE 6

Operation was carried out according to Example 1. To the autoclave were added 12 mmoles of diethylaluminum monochloride diluted with 50 ml of n-heptane and then 1250 g of butene-1 were added thereto. After raising the temperature to 50° C., 55 mg of the first catalyst component A prepared in Example 1 and 50 ml of n-heptane were added together, and then hydrogen was charged to a partial pressure of 1.0 kg/cm$^2$. Thereafter, ethylene was charged to a partial pressure of 12 kg/cm$^2$ to start polymerization. During the polymerization, the temperature in the autoclave was controlled so as to keep a constant temperature of 50° C., and ethylene was supplied continuously so that the total pressure was kept constant. The reaction was carried out for 60 minutes. Thus, 225 g of a white ethylene/butene-1 copolymer were obtained.

By infrared absorption spectrum analysis, it was found that the butene-1 content of the copolymer was 18 mole %. Further, it was found that melt index at 190° C. was 0.15 g/10 min.

This copolymer was formed into a test sample by pressing and the physical properties of the copolymer were measured: Tensile strength 193 kg/cm$^2$; elongation at break 540%; modulus of elastic recovery 89%; modulus of torsion stiffness at 20° C. 174 kg/cm$^2$; and surface hardness (Shore A) 91.

EXAMPLE 7

Operation was carried out according to Example 1. To the autoclave were added 1.2 liter of n-heptane and 12 mmoles of diethylaluminum monochloride, and then 300 g of spent B-B fraction containing 41% of isobutene, 24% of butene-1, 13% of butene-2 and the like were added thereto. After raising the temperature to 90° C. 98 mg of the first catalyst component A prepared in Example 1 were added, and then hydrogen was charged to a partial pressure of 0.2 kg/cm$^2$. Thereafter, ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 30 minutes. Thus, 155 g of a white ethylene/butene-1 copolymer were obtained.

By infrared absorption spectrum analysis, it was found that the butene-1 content of the copolymer was 16 mole %. Further, it was found that melt index at 190° C. was 0.09 g/10 min. This copolymer was formed into a test sample by pressing and the physical properties of the copolymer were measured: Tensile strength 204 kg/cm$^2$; elongation at break 580%; modulus of elastic recovery 92%; modulus of torsion stiffness at 20° C. 249 kg/cm$^2$; and surface hardness (Shore A) 93.

COMPARATIVE EXAMPLE 1

Operation was carried out according to Example 1. To the autoclave were added 2.5 liters of n-heptane and 6 mmoles of diethylaluminum monochloride, and then 50 g of butene-1 were added thereto. After raising the temperature to 90° C., 76 mg of the first catalyst component A prepared in Example 1 were added, and then hydrogen was charged to a partial pressure of 1.0 kg/cm$^2$. Thereafter, ethylene was charged to a partial pressure of 4 kg/cm$^2$ to start polymerization. During the polymerization, the temperature in the autoclave was controlled so as to keep a constant temperature of 90° C., and ethylene was supplied continuously so that the total pressure was kept constant. The reaction was carried out for 20 minutes. Thus, 136 g of a white ethylene/butene-1 copolymer were obtained.

By infrared absorption spectrum analysis, it was found that the butene-1 content of the copolymer was 7.6 mole %. Further, it was found that melt index at 190° C. was 0.10 g/10 min.

This copolymer was formed into a test sample by pressing and the physical properties of the copolymer were measured: Tensile strength 236 kg/cm$^2$; elongation at break 630%; modulus of elastic recovery 78%; modulus of torsion stiffness at 20° C. 932 kg/cm$^2$; surface hardness (Shore A) 100 or more; and surface hardness (Shore D) 53. This shows that a too low butene-1 content gives no soft resin having good elasticity and flexibility.

COMPARATIVE EXAMPLE 2

Operation was carried out according to Example 1. To the autoclave were added 2 liters of n-heptane and 10 mmoles of ethylaluminum sesquichloride, and then 250 g of butene-1 were added thereto. After raising the temperature to 90° C., 68 mg of the first catalyst component A prepared in Example 1 were added. During polymerization, the temperature in the autoclave was controlled so as to keep a constant temperature of 90° C., and ethylene was supplied continuously so that the total pressure was kept constant. The reaction was carried out for 180 minutes. Thus, 192 g of a white ethylene/butene-1 copolymer were obtained.

By infrared absorption spectrum analysis, it was found that the butene-1 content of the copolymer was 35 mole %. Further, it was found that melt index at 190° C. was 0.26 g/10 min.

This copolymer was formed into a test sample by pressing and the physical properties of the copolymer were measured: Tensile strength 44 kg/cm$^2$; elongation at break 560%; modulus of elastic recovery 91%; modulus of torsion stiffness at 20° C. 38 kg/cm$^2$; and surface hardness (Shore A) 62. This shows that a too high butene-1 content gives no soft resin having a high strength.

What is claimed is:

1. A process for producing a soft copolymer which comprises copolymerising ethylene and butene-1 in the presence of a catalyst system comprising (1) a reaction product of (A) an organic titanium compound of the formula, $$Ti(OR)_nX_{4-n}$$

wherein R is a hydrocarbon residue having 1 to 10 carbon atoms, X is a halogen atom and n is a number satisfying the equation $0 < n \leq 4$, and (B) organomagnesium compound, and (2) an organo-aluminum compound of the formula, $$AlR_m'X_{3-m}'$$

wherein R' is a hydrocarbon residue having 1 to 20 carbon atoms, X' is a halogen atom and m is a number satisfying the equation $0 < m \leq 3$, the content of butene-1 in the copolymer being 10 to 30 mole %.

2. A process according to claim 1, wherein R in the formula, $Ti(OR)_nX_{4-n}$ of said organic titanium compound is a member selected from the group consisting of methyl, ethyl, n-propyl, n-butyl, tert-butyl, n-amyl, isoamyl, hexyl, octyl, 2-ethylhexyl and phenyl.

3. A process according to claim 1, wherein the organic titanium compound is a member selected from the group consisting of tetramethoxytitanium, tetraethoxytitanium, tetrabutoxytitanium, tetraoctoxytitanium, triethoxytitanium monochloride, tributoxytitanium monochloride, diethoxytitanium dichloride, diisopropoxytitanium dichloride, dibutoxytitanium dichloride, ethoxytitanium trichloride and n-butoxytitanium trichloride.

4. A process according to claim 1, wherein said organomagnesium compound is one represented by the formula, R"MgX" wherein R" is a hydrocarbon residue having 1 to 10 carbon atoms and X" is a halogen.

5. A process according to claim 4, wherein the R" in the formula, R"MGX" is a member selected from the group consisting of methyl, ethyl, propyl, n-butyl, isobutyl, n-amyl, isoamyl, hexyl, octyl and 2-ethylhexyl.

6. A process according to claim 1, wherein the molar ratio of the organomagnesium compound to the organic titanium compound of the formula $Ti(OR)_nX_{4-n}$ is 0.3 to 3.

7. A process according to claim 6, wherein the molar ratio is 0.5 to 1.5.

8. A process according to claim 1, wherein the molar ratio of organoaluminum compound to the reaction product (converted to titanium base) is 1 to 100.

9. A process according to claim 8, wherein the molar ratio is 3 to 50.

10. A soft copolymer produced by the process of claim 1.

* * * * *